F. W. SCHOEN.
ATTACHMENT FOR EYEGLASSES.
APPLICATION FILED DEC. 1, 1915.

1,177,059.   Patented Mar. 28, 1916.

Inventor
F. W. Schoen

By  Attorneys

UNITED STATES PATENT OFFICE.

FREDERICK W. SCHOEN, OF SCRANTON, PENNSYLVANIA.

ATTACHMENT FOR EYEGLASSES.

1,177,059.  Specification of Letters Patent.  Patented Mar. 28, 1916.

Application filed December 1, 1915. Serial No. 64,508.

*To all whom it may concern:*

Be it known that I, FREDERICK W. SCHOEN, a citizen of the United States, residing at Scranton, in the county of Lackawanna and State of Pennsylvania, have invented certain new and useful Improvements in Attachments for Eyeglasses, of which the following is a specification.

This invention has as its object to provide a novel attachment for eye glasses, spectacles, and the like, which when applied to the lens will constitute an effective cushion in the event of the glasses being dropped and will, therefore, insure against breakage of the lens.

It is one aim of the invention to provide an attachment for the purpose above described which may be readily applied to any ordinary pair of eye glasses or spectacles and which when in place will entirely encompass the lenses so as to protect the same against breakage.

Another aim of the invention is to provide a device for the purpose stated which when in place will afford for the lens to which it is applied a pneumatic cushion entirely surrounding the rim of the lens.

Figure 1:
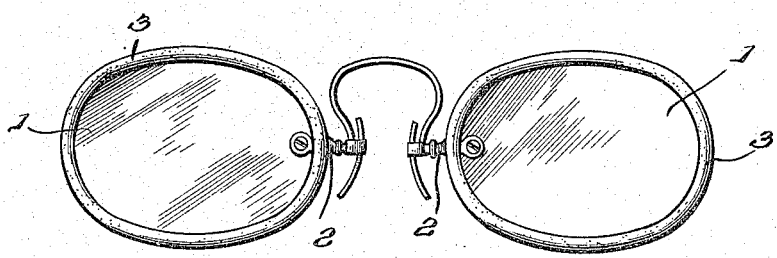
Figure 2:
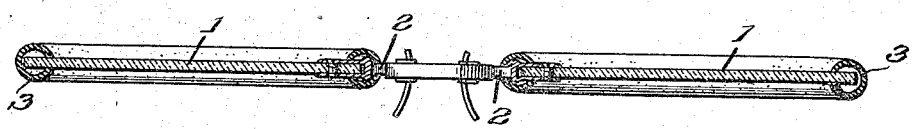
Figure 3:
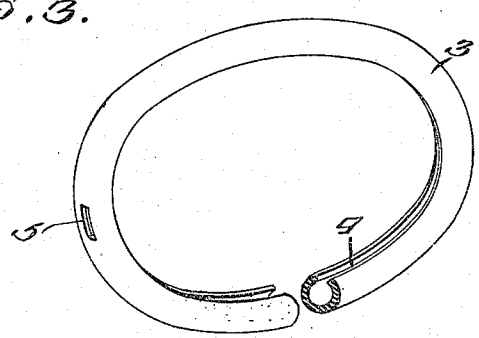

In the accompanying drawings: Figure 1 is a view in elevation of a pair of eye glasses equipped with the device embodying the present invention. Fig. 2 is a horizontal sectional view through the device applied. Fig. 3 is a perspective view of one of the devices, a portion thereof being broken away to illustrate the cross sectional shape of the device.

The device embodying the present invention is in the nature of a rim designed to be fitted to the lens and the rim is preferably made of soft rubber although some other material may be employed if desired.

In the drawings the numeral 1 indicates the lens to which the device is applied and the numeral 2 indicates the box of the nose piece whereby the lens is mounted. The device comprises a rim 3 which is circular, elliptical, or of any other shape corresponding to the marginal outline of the lens to which it is to be applied and this rim is in the form of an open-sided tube, the slot forming the open side being indicated by the numeral 4. While the rim is here shown as substantially circular in cross section it will be understood that it may be of any other desired cross sectional contour and of any desired thickness and cross sectional diameter. In order that the rim may be applied to a lens mounted in the ordinary manner as shown in Figs. 1 and 2 of the drawings, the said rim is formed opposite the slot 4 and at a suitable point in its circumference with a relatively short slit 5. The rim being made of soft rubber is, of course, sufficiently elastic to permit of its being stretched and in applying the rim to the lens that end of the rim in which the slit 5 is formed is stretched longitudinally so as to elongate the said slit and permit the rim to pass over the lens until the said rim completely surrounds or encompasses the margin of the lens. Upon application of the rim to the lens and release of its stretched end, it will, by reason of its inherent elasticity, contract and fit closely to the margin of the lens, the walls of the slit 5 fitting snugly around the box 2 of the lens mounting in the manner clearly shown in Fig. 2 of the drawings. Referring to this figure it will be observed that the walls of the slot 4 fit snugly against the opposite faces of the lens to which the rim is applied and that the marginal portion of the lens is received within the said rim. The snug fit of the walls of the slot 4 against the opposite faces of the lens serves to hold the rim in shape and as the marginal portion of the lens does not completely fill the rim, an air cushion encompassing the lens is afforded and, therefore, in the event of dropping the glasses the lenses will be protected against breakage. The slot 4 is, of course, continuous or in other words extends continuously along the inner side of the rim and the said rim has a tendency to assume the cross sectional shape shown in Figs. 2 and 3 of the drawings so that when applied to the lens the walls of the slot will bear snugly against the faces of the lens.

In Fig. 3 of the drawings the rim is illustrated as partly distended so that the slot 4 may be clearly observed, although it will be understood that initially the walls of the slot are in contact so that they will more firmly bear against the faces of the lens to which the rim is applied.

Having thus described the invention, what is claimed as new is:

1. A device of the class described comprising an elastic hollow rim provided along its inner side with a continuous slot, the walls of the slot being designed to contact the opposite faces of a lens to which the rim is applied, the said rim interiorly being of such width that when applied to a lens the sides of the rim inwardly of the slot will be spaced from the opposite faces of the lens.

2. A device of the class described comprising an elastic hollow rim provided along its inner side with a continuous slot, the walls of the slot being initially in contact and being designed to contact the opposite faces of a lens when the rim is applied thereto, the rim being interiorly of a width greater than the thickness of the lens to which it is to be applied, whereby its sides will be spaced from the opposite faces of the said lens.

3. A device of the class described, comprising an elastic hollow rim provided along its inner side with a continuous slot, the said rim being provided at a point in its circumference with a slit, the walls of the slot being designed to contact the opposite faces of a lens to which the rim is applied and the rim interiorly being of a width greater than the thickness of the said lens to which it is to be applied, whereby its sides will be spaced from the opposite faces of the said lens.

4. A device of the class described comprising an elastic hollow pneumatic rim substantially circular in cross section throughout its extent and provided along its inner side with a continuous slot, the walls of the slot being initially in contact.

In testimony whereof, I affix my signature.

FREDERICK W. SCHOEN. [L. S.]

Copies of this patent may be obtained for five cents each, by addressing the "Commissioner of Patents, Washington, D. C."